United States Patent [19]
Thomann et al.

[11] Patent Number: 5,592,488
[45] Date of Patent: Jan. 7, 1997

[54] METHOD AND APPARATUS FOR PIPELINED MULTIPLEXING EMPLOYING ANALOG DELAYS FOR A MULTIPORT INTERFACE

[75] Inventors: Mark Thomann; Huy T. Vo, both of Boise, Id.

[73] Assignee: Micron Technology, Inc., Boise, Id.

[21] Appl. No.: 477,148

[22] Filed: Jun. 7, 1995

[51] Int. Cl.[6] ................................................. G06F 15/80
[52] U.S. Cl. .......................... 370/465; 395/825; 395/879
[58] Field of Search .............................. 370/94.1, 94.2, 370/100.1; 395/825–827, 845, 856, 858, 871, 878–881

[56] References Cited

U.S. PATENT DOCUMENTS 5,444,858  8/1995  Wakerly ............................ 395/304
5,522,083  5/1996  Gove et al. ........................ 395/800

*Primary Examiner*—Melvin Marcelo
*Attorney, Agent, or Firm*—Schwegman, Lundberg, Woessner & Kluth, P.A.

[57] ABSTRACT

A multiport interface for digital communication systems having pipelined multiplexing of port instructions for increased throughput. The multiport interface includes an analog delay for independent timing of asynchronous operations, such as memory accesses. The multiport interface also has an instruction pipeline and multiplexer to coordinate a number of port instructions.

7 Claims, 9 Drawing Sheets

5,592,488

METHOD AND APPARATUS FOR PIPELINED MULTIPLEXING EMPLOYING ANALOG DELAYS FOR A MULTIPORT INTERFACE

FIELD OF THE INVENTION

The present invention relates to interfaces for digital communication systems and, in particular, to a pipelined multiplexing synchronous interface for digital communication systems.

BACKGROUND OF THE INVENTION

Digital communication systems have evolved from serial first-in-first-out data architectures into multiport, parallel communication systems which require management of the various inputs and outputs available. Extremely high speed digital communication systems include complex architectures to handle specialized protocols for digital communications.

The complex architectures increase the flexibility and programmability of the communication system, however, throughput of the system is limited by the management of each of the modules and components of these complex architectures.

For example, multiport datapath chips are becoming increasingly popular in digital network communication systems. Such chips are generally equipped with several registers and vast amounts of memory and provide programmable, parallel datapaths for network communications. However, the flexibility of these designs raises issues of digital traffic management and control of subsystems.

Further complications arise at very high digital speeds where the asynchronous nature of some digital processes, such as memory storage, tie up large portions of the digital system until completion of the process.

Additionally, digital communication systems which transfer large amounts of digital traffic generally require maximum throughput for efficient digital communications.

Therefore, there is a need in the art for an advanced multiport interface for controlling multiport communication systems. The interface should efficiently manage various operations of the multiport communication system. The interface should also provide maximum hardware utilization while asynchronous processes are conducted to maximize overall throughput.

SUMMARY OF THE INVENTION

The present disclosure describes an interface for controlling multiport digital communication systems. The interface incorporates pipelined multiplexing to benefit from the highly parallel structure of most multiport communication systems. The interface also incorporates analog delay modules for interfacing inherently asynchronous operations of the multiport communication system to the synchronous control structure of the interface.

The present interface provides maximum throughput by efficiently managing simultaneous hardware events using pipelined multiplexing of port instructions issued to the multiport communication architecture. Pipelining allows a number of pending operations to execute on the system to maximize the use of the multiport hardware.

In one embodiment of the present invention, throughput is enhanced through the use of transparent latches in the port multiplexing circuit.

BRIEF DESCRIPTION OF THE DRAWINGS

In the drawings, where like numerals describe like components throughout the several views.

DETAILED DESCRIPTION OF THE PREFERRED EMBODIMENTS

In the following detailed description of the preferred embodiment, references are made to the accompanying drawings which form a part hereof, and in which is shown by way of illustration specific embodiments in which the inventions may be practiced. These embodiments are described in sufficient detail to enable those skilled in the art to practice the invention, and it is to be understood that other embodiments may be utilized and that structural changes may be made without departing from the spirit and scope of the present inventions. The following detailed description is, therefore, not to be taken in a limiting sense, and the scope of the present inventions is defined by the appended claims and equivalents thereof.

Figure 1:
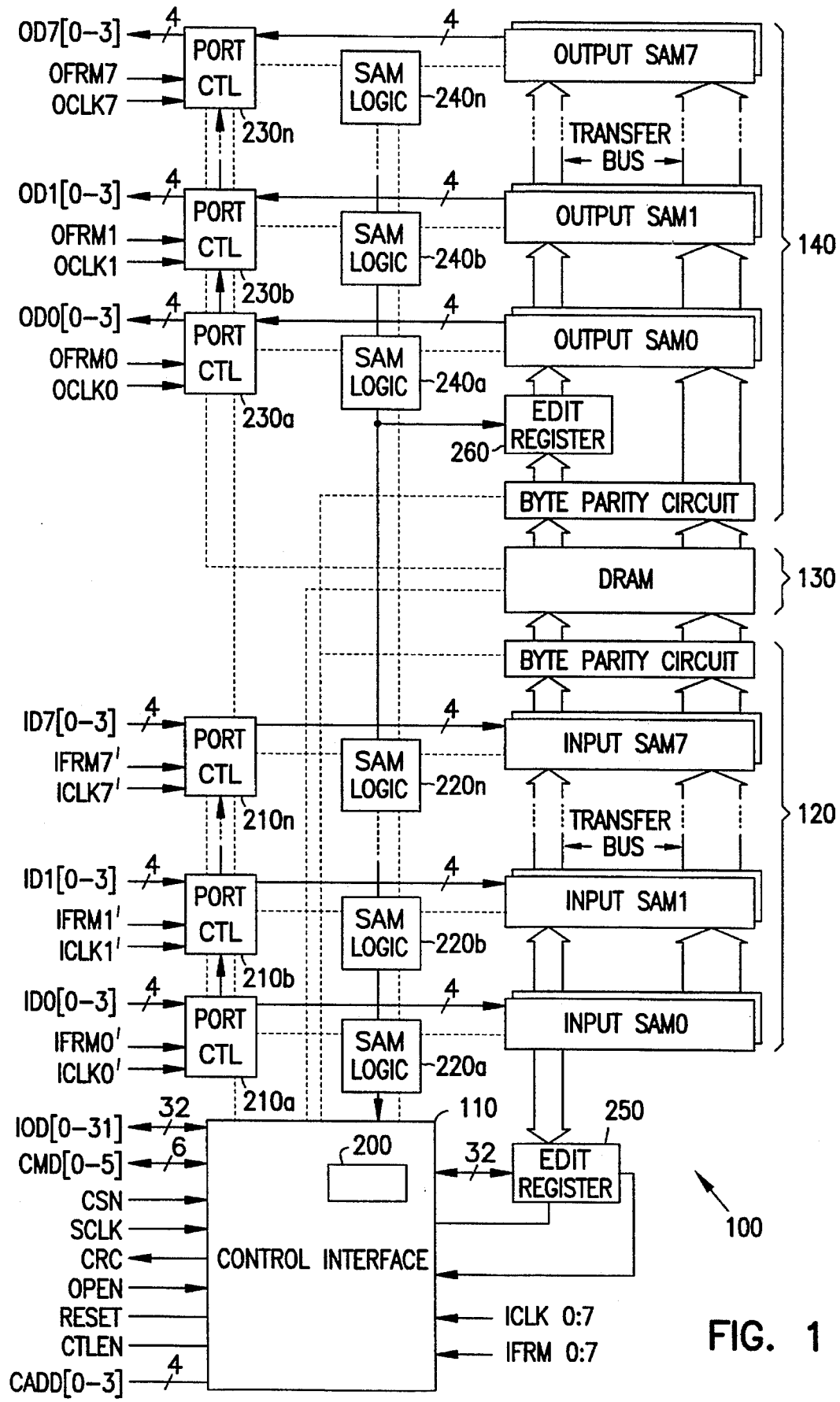
FIG. 1 is a block diagram of one environment in which the present invention may be practiced.

FIG. 1 shows one environment in which the present invention may be used. In this example, the environment is a multiport asynchronous transfer mode (ATM) datapath chip 100 for use in ATM networks. The architecture of the ATM datapath chip can be subdivided into four main building blocks: a control interface 110 for the ATM datapath chip 100, eight asynchronous input ports 210a–210n with associated registers known as serial access memories (SAMs) 120, an ATM cell memory comprising a dynamic random access memory (DRAM) 130, and eight asynchronous output ports 230a–230n with associated SAMs 140.

The control interface 110 contains a configuration register which is programmed to configure the asynchronous input and output ports of the ATM datapath chip 100. Each port in the chip operates asynchronously and at any clock rate within its range. Asynchronous input ports 210a–210n are used to control incoming clock signals, framing signals, and data inputs for input serial access memories 0–7 ("input SAMs"), respectively, for an eight port system. Input data port clocking signals are designated by ICLKn and input data port framing signals are designated by IFRMn. The input data lines in this embodiment are shown as IDx[0–3] to indicate four parallel input bits per asynchronous input port 210. DRAM 130 is a 4 megabit DRAM which is used as storage for data coming into and leaving from the ATM datapath chip 100. Edit buffer 250 and edit register 260 are used to edit cells transferring through the ATM datapath chip 100.

Architectures such as the ATM datapath chip 100 require intelligent port instructions to process data within the chip. Table 1, below, lists several instructions used in ATM datapath chip 100. For example, the GPI instruction requests prepend and postpend data from an input serial access memory (ISAM) number x, which is given in the least significant bits in the instruction as shown in Table 1, below. The prepend and postpend data is transferred to edit buffer 250 and then transferred to control interface 110 for processing. A number of operations are optionally performed on the data in control interface 110. In one embodiment, new CRC bits are generated from the header information in the prepend and postpend data, and the new CRC bits are compared with CRC bits included in the prepend and postpend data to determine if an error has occurred in transmission. Therefore, several other instructions and instruction codes may be incorporated for a variety of data processing operations, and Table 1 demonstrates only some of the possible operations.

TABLE 1

INSTRUCTION CODES

| Mnemonic | Description | MSB | LSB |
| --- | --- | --- | --- |
| GPI | GET P/P ISAMx | 000 | SAM ADDR 000-111 |
| GHI | GET HEAD ISAMx | 001 | SAM ADDR 000-111 |
| GPE | GET P/P | 010 | 000 |
| GHE | GET HEAD | 010 | 100 |
| GST | GET STATUS | 010 | 010 |
| GER | GET ERROR | 010 | 110 |
| STE | STORE ISAMx EB | 100 | SAM ADDR 000-111 |
| ST | STORE ISAMx | 101 | SAM ADDR 000-111 |
| LD | LOAD OSAMx | 110 | SAM ADDR 000-111 |
| PPE | PUT P/P | 111 | 000 |
| PHE | PUT HEAD | 111 | 100 |
| PHEC | PUT HEADw/CRC | 111 | 101 |
| KAL | KEEP ALIVE | 010 | 111 |
| LDC | LOAD CONFIG | 111 | 010 |
| OPE | OR P/P | 111 | 011 |
| OHE | OR HEAD | 111 | 110 |
| OHEC | OR HEADw/CRC | 111 | 001 |
| UDF | UNDEFINED | 010 | 001 |
|  |  | 010 | 011 |
|  |  | 010 | 101 |
| NOP | NO OPERATION | 111 | 111 |
| TM | TEST MODE | 011 | xxx |

There are three types of DRAM 130 memory cycle operations: STORE, LOAD, and REFRESH. These DRAM 130 memory cycles are initiated by the STORE ISAMx, STORE ISAMx w/EDIT BUFFER, LOAD OSAMx, and REFRESH instructions. In this ATM datapath chip, DRAM memory cycles are self-timed activities that take 110 nanoseconds to complete. The 110 ns is matched to four instruction cycles at the highest control interface SCLK rate of 27.7 ns.

A STORE sequence starts with a GET HEAD ISAMx instruction, which loads the edit buffer 250, continues through the STORE ISAMx w/EDIT BUFFER or STORE ISAMx instruction, and ends with the DRAM memory cycle completing. In this environment, PUT_HEC, PUT_HE, and PUT_PP instructions are issued 1 cycle after the STORE. It is not possible to re-use the edit buffer 250 until an analog period where the data is latched into the parity circuit. Alternatively, when the edit buffer 250 is not used, a STORE sequence starts with a STORE ISAMx instruction and ends with the DRAM memory cycle completing.

A LOAD sequence starts with the LOAD OSAMx instruction, and ends with the DRAM memory cycle completing. OR HEAD w/CRC, OR HEAD and OR P/P instructions can be issued one cycle after the LOAD SAMx instruction. Note that it is not possible to re-load the output edit register 260 before the DRAM cycle completes.

A REFRESH sequence starts with the REFRESH instruction and ends with the DRAM refresh cycle completing. A REFRESH sequence must be executed 1024 times every 32 milliseconds. The DRAM memory cycle time of 110 ns is one third of the 330 ns cell time supported at the maximum aggregate throughput data rate. This provides ample time to place REFRESH sequences in the instruction stream.

One Embodiment of a Pipelined Multiplexing Multiport Interface

Figure 2:
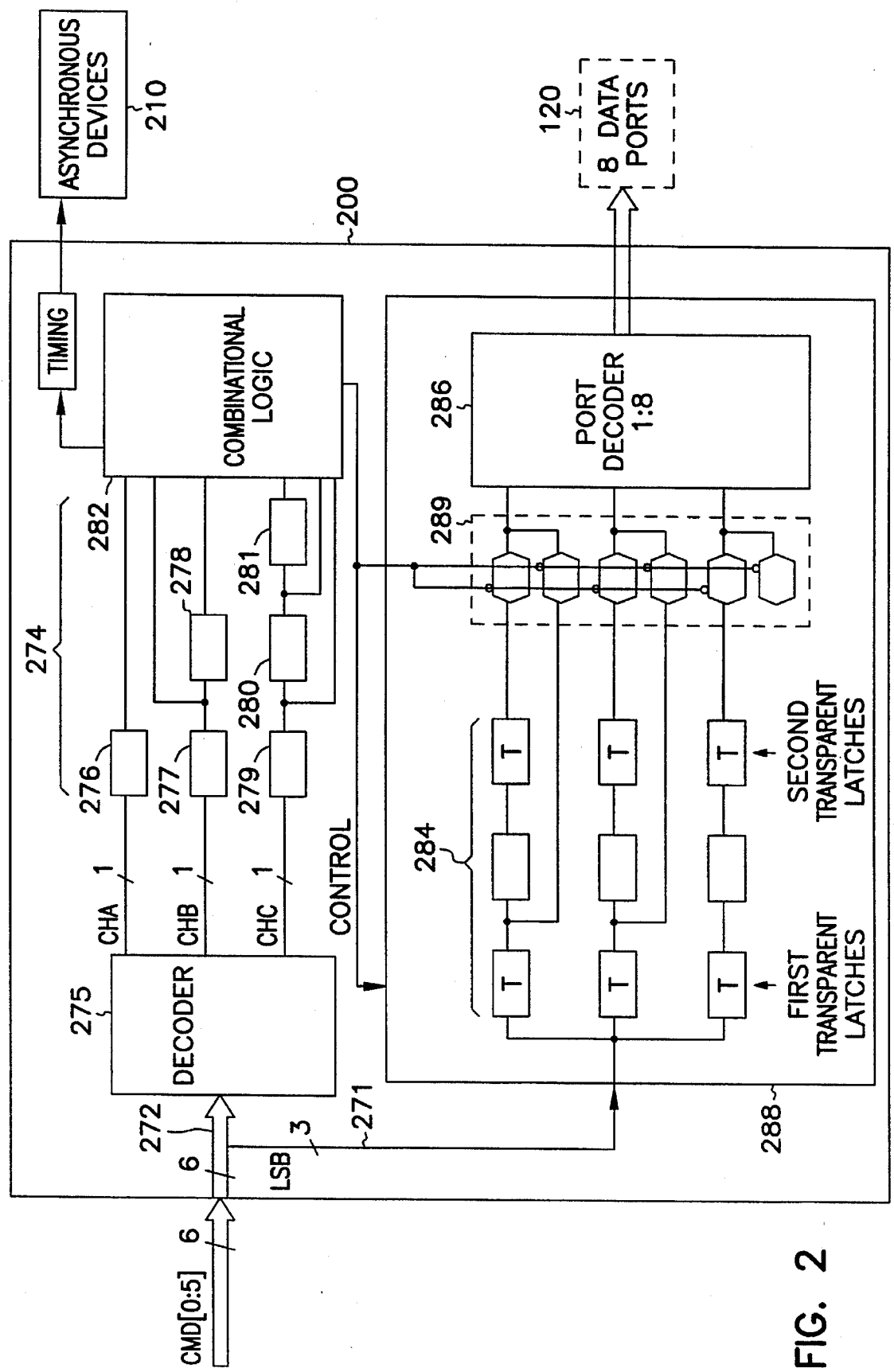
FIG. 2 is a block diagram of one example of a pipelined multiplexing multiport interface.

Interface 200 in control interface 110 performs the pipelined multiplexing of the instructions issued to ATM datapath chip 100. FIG. 2 shows a detailed block diagram of one embodiment of a pipelined multiplexing multiport interface 200.

Instruction codes enter the interface 200 on lines CMD [0:5] on bus 272. Decoder 275 receives all six bits of the instruction code on bus 272. The three least significant bits are received by address registers 284 using bus 271. Bus 271 provides the three least significant bits to address registers 284. The instructions for this environment are given in Table 1, above, and are pipelined and multiplexed by this embodiment of the present invention shown in FIG. 2. The CMD [0:5] bits are decoded by decoder 275 and presented to combinational logic 280 via instruction buffer network 274. Single cycle instructions are automatically channelled to Channel A according to the instruction code presented to decoder 275. Similarly, double cycle instructions are channelled to Channel B and triple cycle instructions are channeled to Channel C. Registers 276–281 hold the instruction bits which create the instruction pipeline. Instructions are received by combinational logic 282 and processed to provide pipelined and multiplexed instructions for addressing each of the 8 data ports 120.

The addresses for each instruction are stored in address registers 284. Port decoder 286 receives the address information in combination with instructions from combinational logic 282 to perform the pipelined multiplexed multiport instructions.

Address registers 284 incorporate first and second transparent latches separated by a register as shown in FIG. 2. The transparent latches are denoted with a "T". These latches allow free data flow through them unless the latch is clocked. This allows rapid transfer through the address registers 284 for single cycle instructions, since strobing the middle register allows for transfer of the bit information entering address registers 284 in one strobe. Multiplex array 289 provides data to port decoder 286 from either the first transparent latch or from the second transparent latch, depending on control signals from combinational logic 282.

Figure 3A:
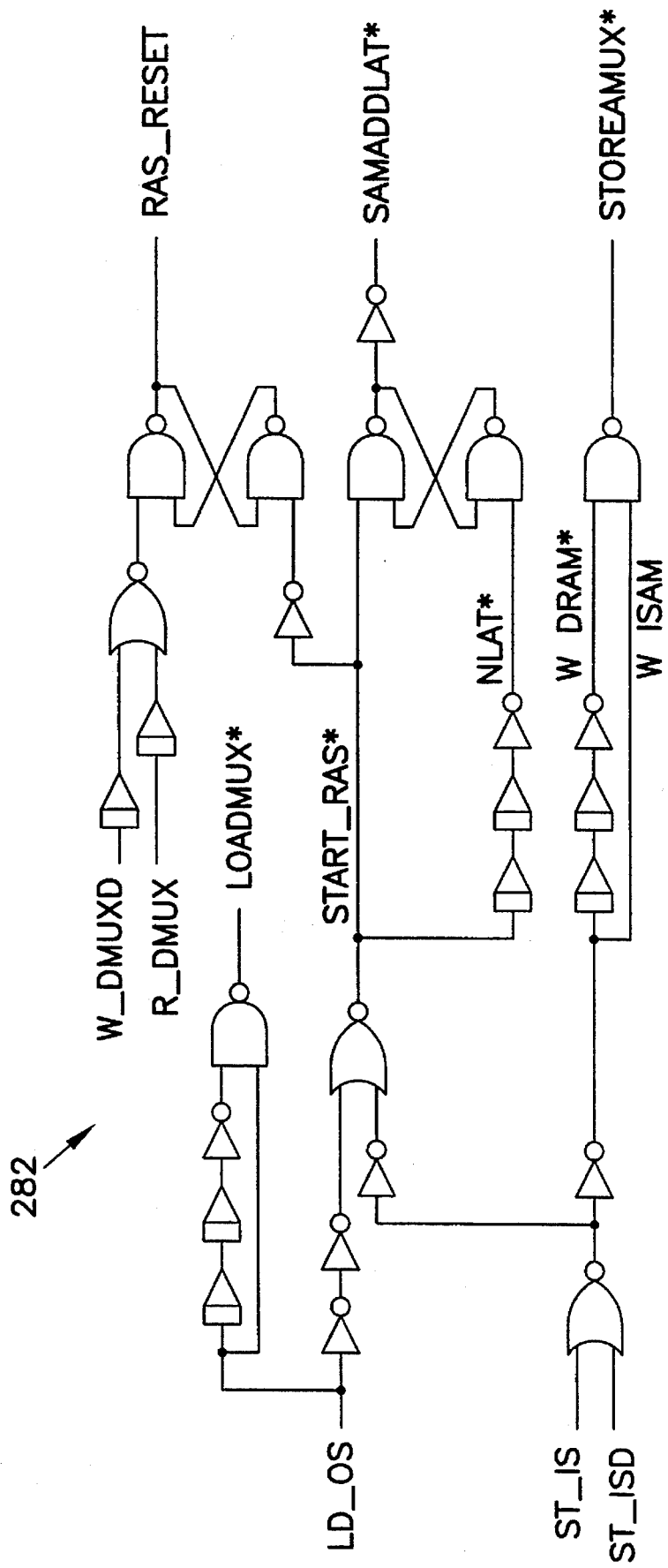
FIG. 3A and FIG. 3B and FIG. 3C are detailed schematic diagrams of one example of a pipelined multiplexing multiport interface.
Figure 3B:
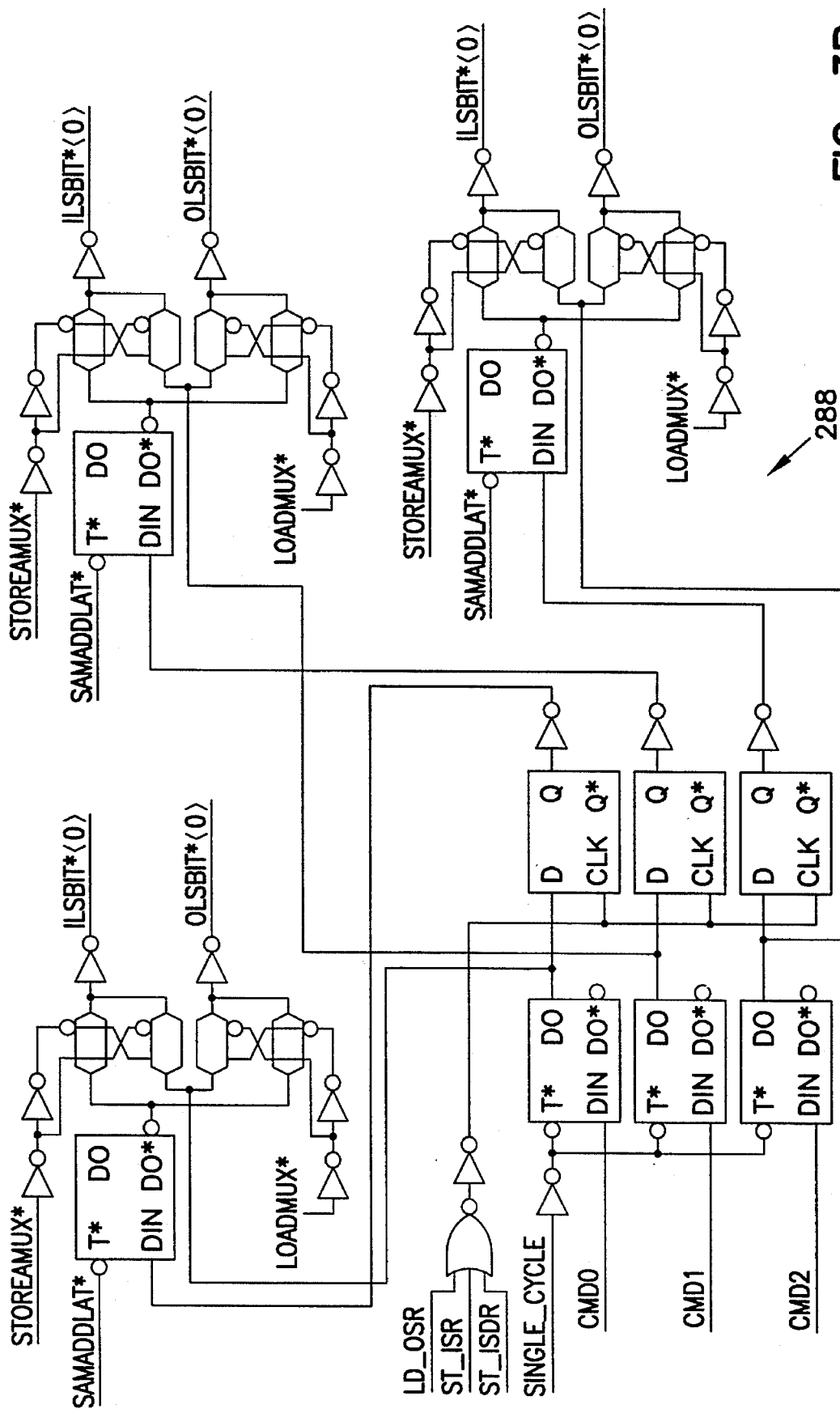
Figure 3C:
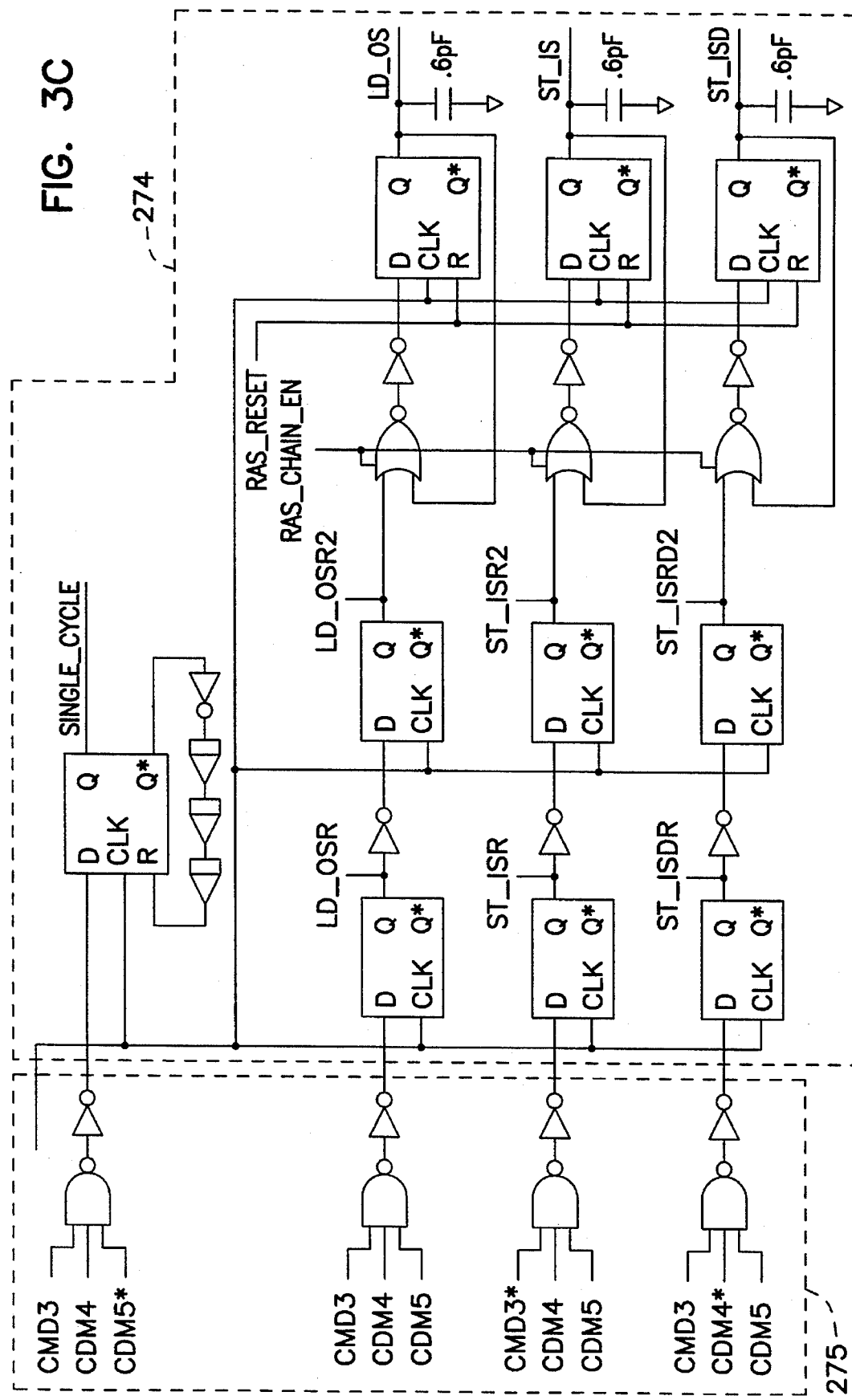

FIG. 3A, FIG. 3B and FIG. 3C provide a detailed schematic diagram of interface 200, showing hardware realizations of decoder 275, instruction buffer network 274, port multiplexer circuit 288, and combinational logic 282.

Figure 4:
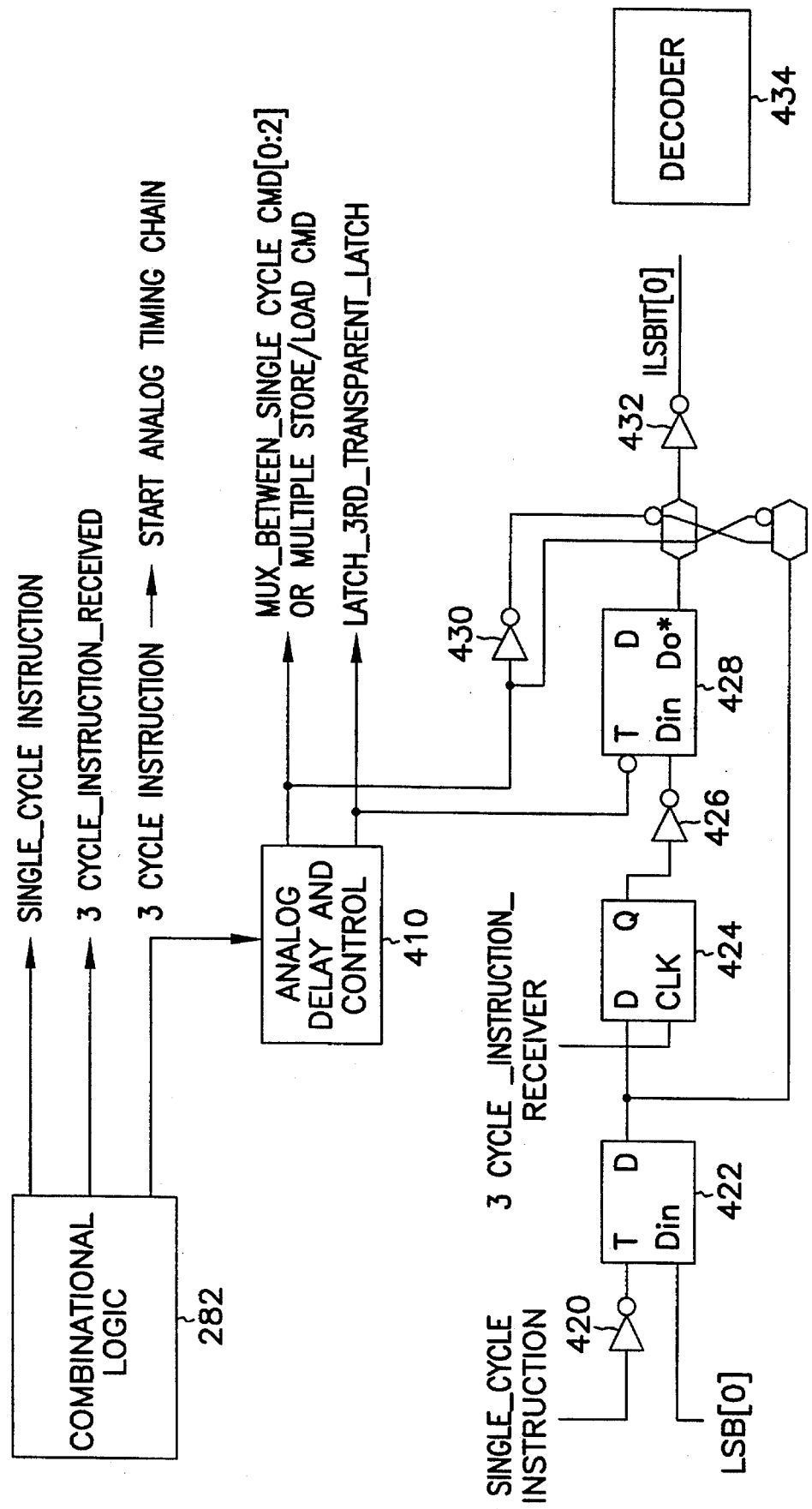
FIG. 4 is a detailed schematic of one embodiment of an analog timing circuit.

FIG. 4 shows the analog delay and control used in timing DRAM 130 accesses. Combinational logic 282 sends a start_timing_chain signal to analog delay and control logic 410. Analog delay 410 inhibits the ILSBIT[0] signal until the end of the delay is reached. This circuit enables other operations to proceed so that the asynchronous nature of the DRAM 130 operation is unaffected. Instructions may be issued as soon as the analog delay is timed out allowing for a faster and more flexible architecture independent of cycle time. In addition, the asynchronicity of the DRAM 130 is isolated from the timing of the rest of the interface by using the analog delay 410.

Figure 5:
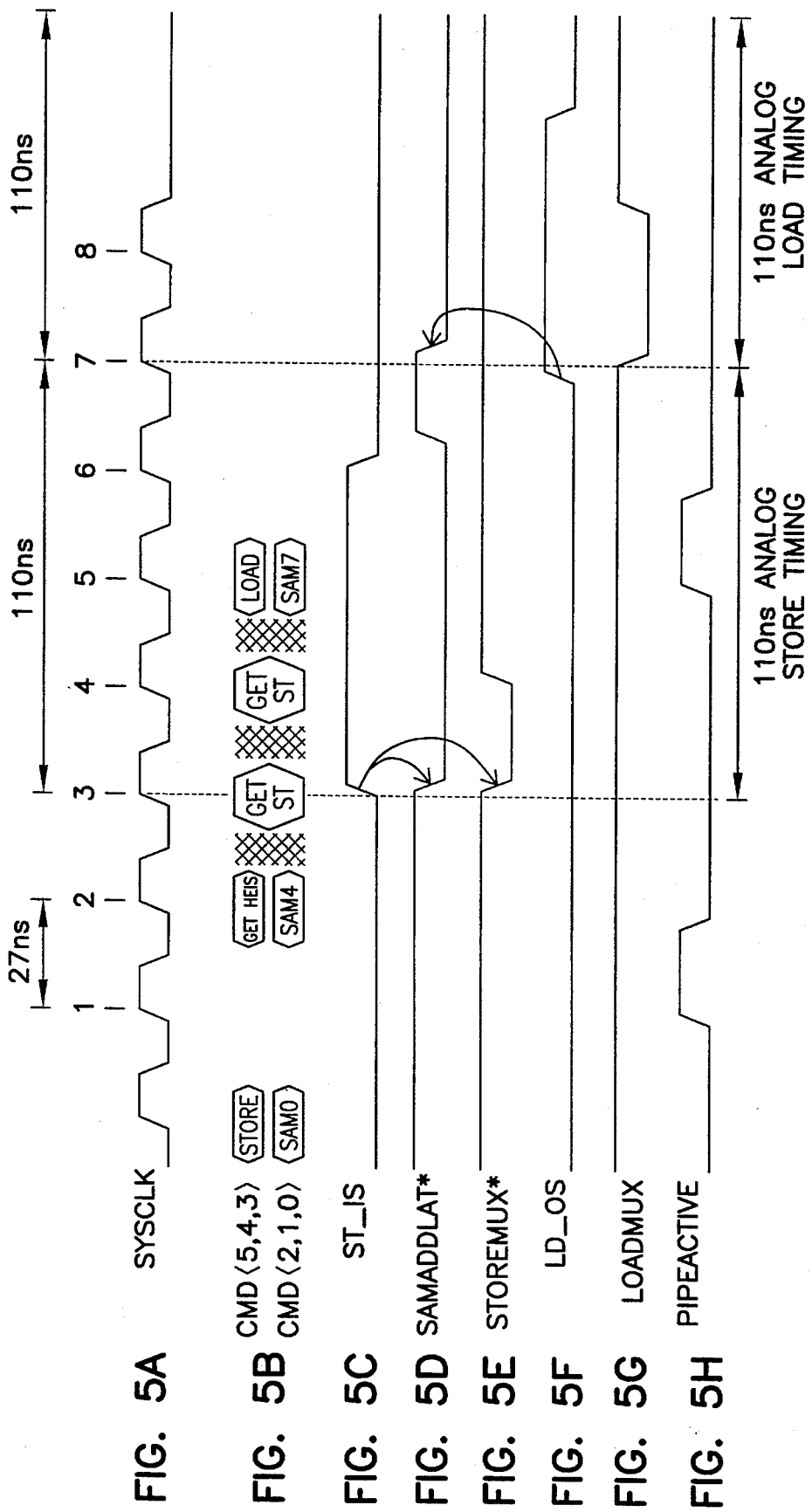
FIG. 5 is a timing diagram showing the operation of the analog timing circuit in pipelined multiplexing operation of the interface.

FIG. 5 is a detailed timing diagram, showing the pipelined multiplexing of a store and a load and the operation of the analog delay in the environment shown in FIG. 1. The first trace is the system clock SYSCLK and the store is initiated on the first clock pulse, denoted by a "1". Since the rising edges are used in this embodiment, the numbering of the clock pulses is derived on the rising edges of the clock pulse train. A store instruction is begun on clock pulse 1, but the store is not performed until clock pulse 3, which leaves clock pulse 2 for pipelined multiplexing of another instruction. In this example, a get header command is issued in clock pulse 2.

The second trace describes the data on each of the 6 command lines CMD[0–5]. The store instruction is decoded on clock pulse 1 and the address of port 0 (SAM 0), which is on CMD[0–2], is latched into register 279 of instruction buffer network 274, since the store instruction is a three cycle instruction. The last trace is a PIPEACTIVE trace which is used to load the second address register 284 for later use of the address information. On clock pulse 2, another instruction is added to the pipeline, and as stated earlier, is a get header command in this instance. On clock pulse 3 the store instruction is being executed, which requires a 110 nanosecond analog store timing procedure to store the contents of port 0 to the DRAM 130. The address of port 0 was stored in the address registers 284 on clock pulse 1.

The SAMADDLAT* signal goes low on clock pulse 3 to indicate the beginning of the DRAM store sequence. The STOREMUX* signal indicates an analog delay to give time to store the contents of port 0 into DRAM 130 over their common data transfer bus, CMD[0–2]. After the STOREMUX* signal goes high, the data transfer bus, CMD[0–2], is available for other operations. However, the store is not complete until SAMADDLAT* goes to a logic high, based on the 110 nanosecond analog delay initiated during clock pulse 3.

The store instruction is completed in clock pulse 7, due to the 110 nanosecond delay. A load instruction is entered on clock pulse 5, but the load sequence will not begin until clock pulse 7, thereby pipelining the ongoing store with the pending load over clock pulses 5 through 7. Although not shown in FIG. 4, other instructions could be pipelined on clock pulses 4, 5, or 6 which use the CMD[0–2] lines.

The STOREMUX* signal shows multiplexing between the three least significant bits of a store operation to the DRAM 130 and the LOADMUX signal shows multiplexing between the three least significant bits of a load operation.

Figure 6:
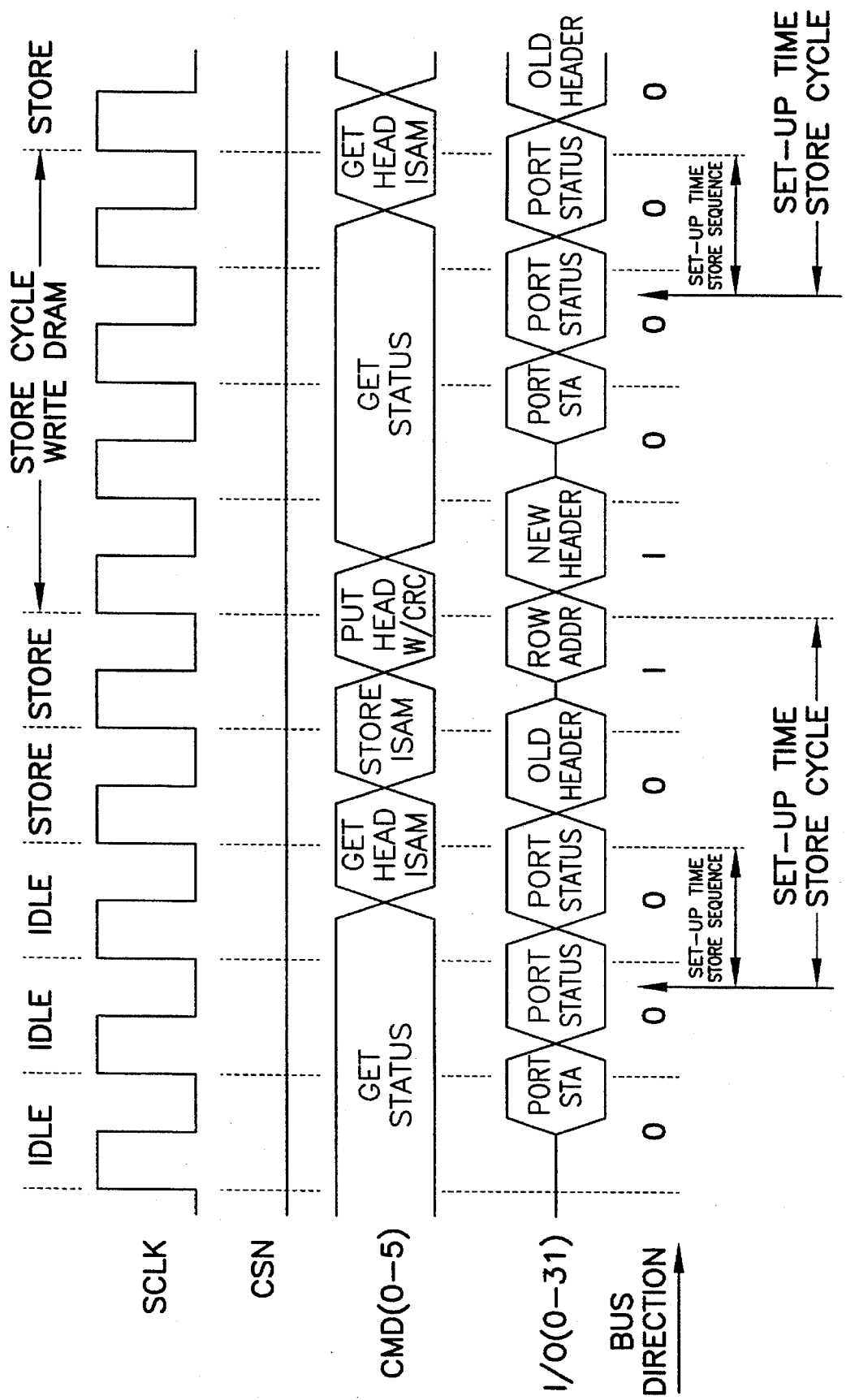
FIG. 6 is a timing diagram of a store sequence using pipelined multiplexing with other multiport instructions.
Figure 7:
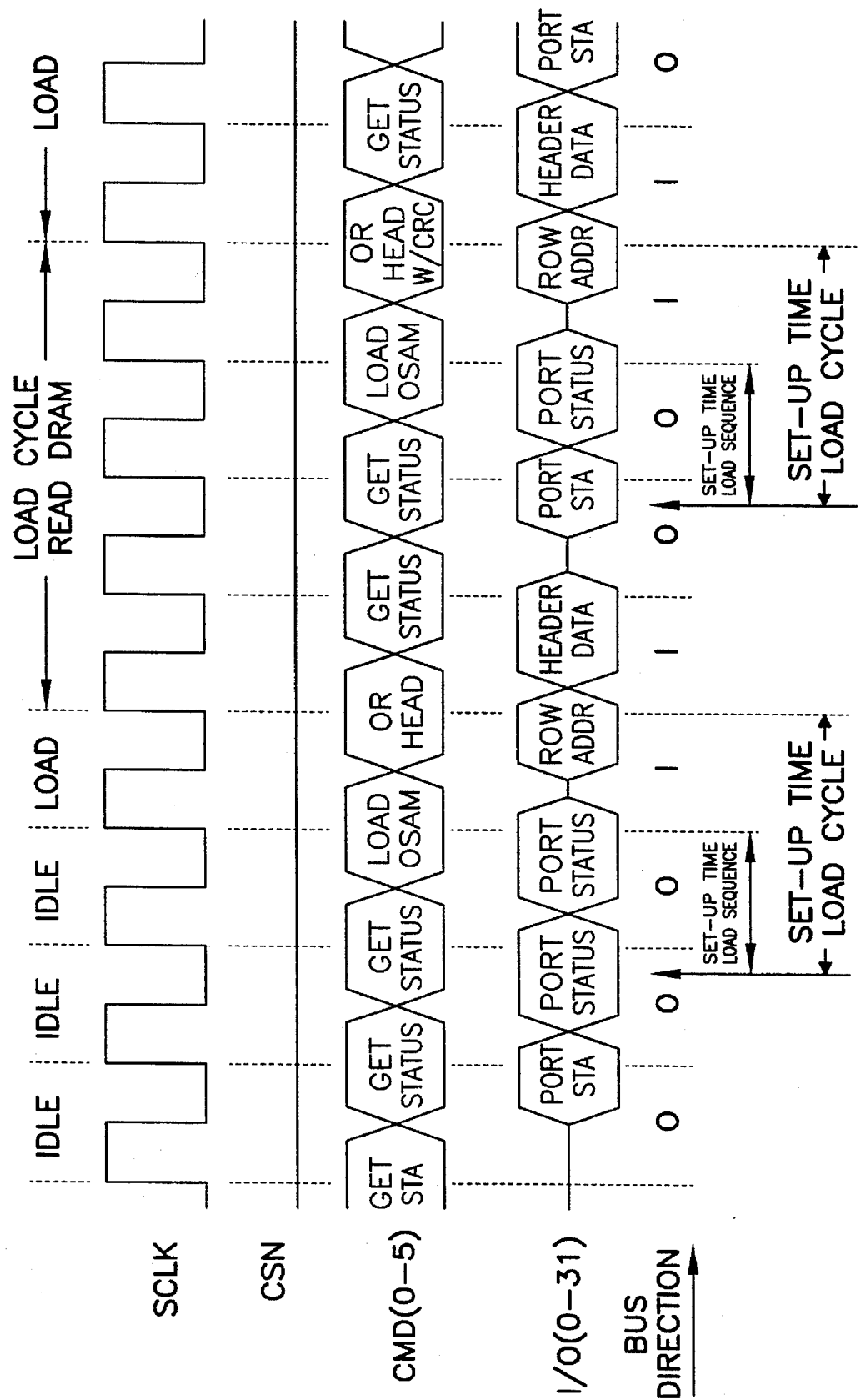
FIG. 7 is a timing diagram of a load sequence which is pipelined multiplexed with other multiport instructions.

FIG. 6 is a timing diagram showing a store sequence for the DRAM 130. FIG. 6 demonstrates a store instruction which ties up the write transfer bus during a store, which is the bus which transfers data from input ports 120 to DRAM 130. The transfer bus which is in use in an executing instruction may not be used in a second pipelined instruction. FIG. 7 is a timing diagram showing the effect of pipelined multiplexing on a load instruction. Load timing has fewer timing constraints than a store, since in a load operation, there is no conflict with the use of the data bus and access to the edit buffer 250.

Although the present invention has been demonstrated in an ATM datapath chip 100, those skilled in the art will readily recognize that the present invention may be used in any multiport digital system for pipelined multiplexed synchronous instructions. The embodiment having the analog delay circuit is applicable to digital electronics having asynchronous operations which must be coordinated with other synchronous operations. Therefore the present invention is not limited to the ATM datapath chip application demonstrated by this specification.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the electrical, computer, and telecommunications arts will readily appreciate that the present invention may be implemented in a very wide variety of embodiments. This application is intended to cover any adaptations or variations of the preferred embodiment discussed herein. Therefore, it is manifestly intended that this invention be limited only by the claims and the equivalents thereof.

What is claimed is:

1. A synchronous multiport interface for pipelined multiplexing of a plurality of port instructions issued in a digital communications system having a multiport architecture, comprising:

an instruction decoder for decoding the plurality of port instructions;

an instruction pipeline, connected to the instruction decoder, for sequentially storing a plurality of issued port instructions; and an instruction multiplexer, connected to the instruction pipeline, for coordinating simultaneous execution of the plurality of issued port instructions in the instruction pipeline;

wherein the instruction pipeline has storage for single cycle, double cycle, and triple cycle port instructions issued by the digital communications system.

2. The synchronous multiport interface of claim 1 further comprising an analog delay for timing asynchronous operations in the multiport architecture.

3. The synchronous multiport interface of claim 1, wherein the instruction multiplexer comprises:

a port decoder; and a plurality of address registers, the plurality of address registers having a network of parallel paths, each path comprising a first transparent latch with a first input and a first output, a register having a register input and a register output, and a second transparent latch having a second input and a second output, wherein the first output is connected to the register input, the register output is connected to the second input, wherein bit information enters the first input and is output from either the first output or the second output of each parallel path to the port decoder.

4. The synchronous multiport interface of claim 3, wherein the first output and the second output are multiplexed to produce outputs from the first transparent latch and the second transparent latch.

5. The synchronous multiport interface of claim 1, wherein the instruction pipeline comprises:

combinational logic for decoding a plurality of port instructions and producing control signals for the instruction multiplexer;

a plurality of instruction paths, interconnecting the instruction decoder to the combinational logic, for pipelining instructions, the plurality of instruction paths comprising:
- a first path comprising a latch A;
- a second path comprising a latch B and a latch C which are serially connected; and
- a third path comprising a latch D, a latch E, and a latch F which are serially connected, wherein port instructions are sequentially stored in each path of the plurality of instruction paths and wherein there is an additional signal tap between latch B and latch C to the combinational logic, between latch D and latch E to the combinational logic, and between latch E and latch F to the combinational logic.

6. A method for interfacing a synchronous interface to an asynchronous process having a characteristic time delay using an analog delay having an delay time T and a trigger circuit which produces a signal at a time T following a trigger of the trigger circuit, comprising the steps of:
- setting the delay time T of the analog delay to at least the characteristic time delay;
- if the asynchronous process is invoked, triggering the trigger circuit; and
- suspending operations requiring a result from the asynchronous process until the signal is produced from the trigger circuit.

7. The method of claim 6 wherein the delay time T is equal to the access time of a dynamic random access memory.

* * * * *